United States Patent Office 3,478,003
Patented Nov. 11, 1969

3,478,003
CATIONIC POLYACRYLAMIDE TERPOLYMERS
Jack C. McClendon, Lake Jackson, Tex., assignor to The Dow Chemical Company, Midland, Mich., a corporation of Delaware
No Drawing. Filed May 13, 1968, Ser. No. 728,747
Int. Cl. C08f 27/08
U.S. Cl. 260—80.73                    9 Claims

ABSTRACT OF THE DISCLOSURE

Water-soluble cationic polyacrylamides useful as flocculants are prepared by chemical modification of a polyacrylamide (1) by transamidation with a diamine of Formula 2 or 3:

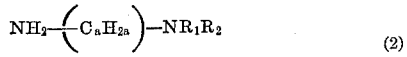

(2)

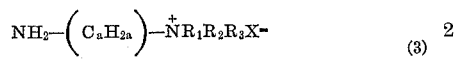

(3)

where $R_1$, $R_2$ and $R_3$ are alkyl or hydroxyalkyl groups, $a$ is 2–5 and X is a counteranion. The transamidation is carried out in a glycol and a portion of the glycol is incorporated in the cationic product as an ester.

BACKGROUND

Modification of polyacrylamides by the Mannich reaction with formaldehyde and amines is described in Grimm et al. U.S. Patent 2,328,901. Typically the carbamoyl polymer is reacted with formaldehyde and dimethylamine in dilute aqueous solution to minimize formation of insoluble cross-linked gels. Thereafter recovery of the modified polyacrylamide as a solid product requires complex and careful handling because of the large volume of water which must be removed and the tendency of the product to crosslink and become water insoluble.

In practice the advantages of handling and transporting solid polymeric products rather than dilute aqueous polymer solutions renders a stable, solid form of a cationic polyacrylamide highly desirable.

STATEMENT OF THE INVENTION

It has now been discovered that solid water-soluble cationic polyacrylamide terpolymers useful as flocculants can be prepared by transamidation of a water-soluble polyacrylamide having the formula:

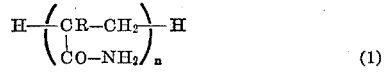

(1)

where R is H or $C_1$–$C_4$ alkyl and $n$ is a number such that the polyacrylamide has an average molecular weight of at least $0.1 \times 10^6$, with an alkylene diamine having the formula:

$$NH_2C_aH_{2a}NR_1R_2 \qquad (2)$$

or

(3)

where $R_1$, $R_2$, and $R_3$ individually are $C_1$–$C_4$ alkyl or $C_2$–$C_4$ hydroxyalkyl groups, $a$ is 2–5, and X is a counteranion, in the presence of an alkylene glycol or glycol ether having the formula:

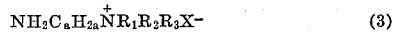

(4)

where R′ is H or $C_1$–$C_4$ alkyl and $b$ is 2–5. More specifically the transamidation is carried out by heating the polyacrylamide with about 0.5–3.0 moles of the alkylenediamine per mer of polyacrylamide at about 80–150° C. Preferably the polyacrylamide has an average molecular weight of about $1$–$10 \times 10^6$.

Particularly active cationic polymers are obtained when the transamidation yields a product and consisting essentially of a water-soluble terpolymer of (A) about 20–70 weight percent of an acrylamide having the formula:

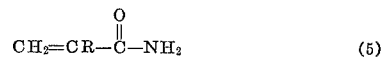

(5)

where R is H or $C_1$–$C_4$ alkyl; (B) about 20–75 weight percent of an N-aminoalkylacrylamide having the formula:

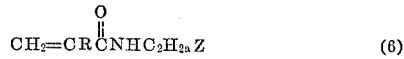

(6)

where R is H or $C_1$–$C_4$ alkyl, $a$ is 2–5, and Z is a tertiary or quaternary nitrogen group having the formula:

$$-NR_1R_2 \qquad (7)$$

or

(8)

where $R_1$, $R_2$ and $R_3$ individually are $C_1$–$C_4$ alkyl or $C_2$–$C_4$ hydroxyalkyl groups and X is a counteranion; and (C) about 5–20 weight percent of an oxyalkyl acrylate having the formula:

(9)

where R and R′ individually are H or $C_1$–$C_4$ alkyl, and $b$ is 2–5.

It has further been discovered that when the diamine and resulting cationic polymer contains a tertiary amino group, the cationic terpolymer can be precipitated from the glycol solution as a stable, solid salt by addition of a strong mineral acid, preferably HCl, HBr or HNO₃.

These water-soluble cationic terpolymers have enhanced flocculant activity and are also useful additives in the preparation of paper and other cellulosic products.

Reactants

The novel cationic polyacrylamide terpolymers are advantageously prepared by modification of a preformed polyacrylamide of Formula 1:

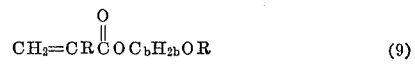

where R is H or $C_1$–$C_4$ alkyl and $x$ is a number such that the polyacrylamide has an average molecular weight of at least $0.1 \times 10^6$ and preferably about $1$–$10 \times 10^6$. Such high molecular weight polyacrylamides are known commercial products.

In the present invention such an essentially nonionic polyacrylamide is chemically modified by reaction with an alkylene diamine having one primary and one tertiary or quaternary nitrogen, i.e., a diamine of Formula 2 or 3:

$$NH_2-(C_aH_{2a})-NR_1R_2 \qquad (2)$$

$$NH_2-(C_aH_{2a})-NR_1R_2R_3X \qquad (3)$$

Suitable diamines include dimethylaminoethylamine, dimethylaminopropylamine, diethylaminobutylamine, di-(2-hydroxyethyl)aminoethylamine, aminoethyltrimethylammonium chloride, aminopropyltriethylammonium chloride, aminoethyldi-(2 - hydroxyethyl)methylammonium chloride, and the like. For a water-soluble product, the diamine should itself be water-soluble at room temperature. Preferably the quaternary nitrogen is in halide form although salts with other counteranions such as carbonate, bicarbonate, sulfate, acetate, and nitrate can be used.

In this transamidation, a liquid essentially anhydrous glycol or glycol ether is used as a mutual solvent for the reactants. Preferred are such liquids as ethylene glycol, propylene glycol, 1,4-butanediol, methoxyethanol and other solvents of the formula:

$$HO(C_bH_{2b})OR' \qquad (3)$$

as well as mixtures thereof. Such glycols not only dissolve the reactants and provide a fluid reaction medium at the normal transamidation temperatures of about 80°–150° C., but also react themselves to introduce oxyalkylester groups which improve the plasticity and solubility of the final cationic polyacrylamides.

Reaction conditions

The transamidation requires a temperature of about 80°–150° C. and essentially anhydrous conditions to prevent hydrolysis of the polyacrylamide. Normally the polyacrylamide is dissolved in sufficient glycol to give about a 5–30 weight percent solution. Then about 0.5–3.0 moles of diamine per mer of the polyacrylamide is added and the mixture heated at about 80°–150° C. for a sufficient time to obtain the desired transamidation.

If less than about 0.5 mole of diamine per mer is used, the product is only weakly cationic and does not have the desired improved flocculant activity. Preferably about 0.5–1.25 mole of diamine per mer polyacrylamide is used. An amount greater than 3.0 moles contributes little further to the product activity and utility.

Under these conditions, transamidation occurs readily at 80°–150° C. in 0.5–4 hrs. Conveniently it is run at reflux if the boiling point of the solvent is within the desired temperature range. A moderate elevated or reduced pressure can be used. However, temperatures appreciably above 150° C. should be avoided to prevent degradation of the polymer.

Cationic polyacrylamide

The cationic polyacrylamide obtained by this transamidation process contains amide, aminoalkylamide and ester groups. Particularly effective flocculants are transamidation products containing in copolymerized form about 20–70 weight percent of an acrylamide of Formula 5, about 20–75 weight percent of an N-aminoalkylacrylamide of Formula 6, and about 5–20 weight percent of an oxyalkyl acrylate of Formula 9.

The product is normally obtained mixed with the glycol. For some applications it can be used without removal of the glycol by dilution with water or other solvent. Or the glycol can be removed by extracting or washing the polymer with a solvent in which the glycol but not the polymer is soluble.

Alternately, for some applications in which a dry, solid product is desirable, the polyacrylamide modified by transamidation with an alkylenediamine containing a tertiary amino group has the further advantage of forming a stable, solid salt with limited solubility in the glycol solvent when treated with a strong mineral acid, preferably HCl, HBr or HNO₃. Often it is desirable to dilute the modified polyacrylamide glycol mixture with an alcohol such as methanol, isopropanol, n-hexanol or isoamyl alcohol prior to the precipitation of the cationic polyacrylamide with the mineral acid. Water should be held at a minimum throughout the process for maximum recovery of the precipitated product.

To illustrate further the present invention and the improved activity of the modified, cationic polyacrylamides, the following examples are given. Unless otherwise stated all parts and percentages are by weight.

*Example 1:* Modified cationic polyacrylamide. — A stirred reactor was charged with 121.3 parts of dry ethylene glycol, 40.5 parts of dry propylene glycol, 36.0 parts (0.51 mer) of high molecular weight polyacrylamide (0.5% aqueous solution viscosity of 6.7 cs. at 100° F.), and 35.5 parts (0.40 mole) of dimethylaminoethylamine. The stirred mixture was heated at 130° C. for 2 hours forming a very viscous light brown to white colored mass. Its IR substituent analysis was:

| | Percent |
|---|---|
| —CONH₂ | 31 |
| —CONHC₂H₄N(CH₃)₂ | 57 |
| —COOC₂H₄OH | 12 |

To the above mass was added 600.5 parts of water and 61.3 parts of concentrated hydrochloric acid to yield an 8% polymer solution having a bulk viscosity of about 995,000 cps. at 25° C. This 8% cationic polymer solution is stable on storage and is effective as a flocculant for arrow root starch, a material not flocculated by the unmodified high molecular weight polyacrylamide.

*Example 2:* Precipitated cationic polyacrylamide. — As preferred method of isolating and purifying the modified cationic polyacrylamide, the reaction product from another run as described in Example 1 was dissolved in about 80 parts isobutyl alcohol by heating at 115–130° C. with stirring. The resulting solution was cooled to below 50° C. and 98.8 parts of 19.7% anhydrous HCl (0.53 mole) in isobutyl alcohol added to precipitate the cationic polyacrylamide as the hydrochloride. The precipitated salt was recovered and dried. A sample having the same IR analysis given in Example 1 decomposed on heating at about 175° C. Its solubility in water was about 8% at 25° C. Its viscosity as a 0.5% solution in distilled water at 35° C. was 51 cps.

*Example 3:* Flocculant activity.—As a standard test for flocculant activity with arrow root starch, the following procedure was used.

A test slurry is prepared by adding 5 g. dry arrowroot starch to a 100 ml. graduated cylinder, diluting to 100 ml. with distilled water, shaking, and allowing to settle for at least 10 min. Then the desired amount of test polymer is added to the aqueous starch mixture in 3 equal portions of a 0.05% solution. After each addition, the slurry is gently blended by inverting the graduated cylinder slowly three times. After the third addition and mixing, the cylinder is placed upright on a level surface and the flocculation rate determined by measuring the settling rate of the suspended starch. The time for the starch to drop from the 90 ml. to the 40 ml. graduation mark and the distance in inches between these marks are measured and the flocculation rate in inches/min. calculated.

Typical data illustrating the effect of process conditions on modification of the high molecular weight polyacrylamide by reaction with dimethylaminoethylamine in glycol as described in Example 1 are shown in Table 1.

Similar data on modified cationic polyacrylamides obtained by transamidation with other primary amines in ethylene glycol are given in Table 2.

TABLE 1.—FLOCCULANT ACTIVITY OF MODIFIED CATIONIC POLYACRYLAMIDE

| Run | Transamidation Conditions | | Starch Flocculation, in./min. | |
|---|---|---|---|---|
| | Ratio [a] | T., ° C./Time | 5.0 p.p.m. | 10.0 p.p.m. |
| 3A-1 | [b] 0 | | 0 | 0 |
| 3A-2 | 3.0 | 115°/3 hrs | 14.1 | 16.5 |
| 3A-3 | 0.9 | 150°/0.5 hr | 11.3 | 10.4 |
| 3A-4 | 3.0 | 130°/2 hrs | 14.0 | 12.5 |
| 3A-5 | 1.0 | 115°/3.25 hrs | 13.4 | 17.5 |
| 3A-6 | 0.5 | 130°/0.5 hr | 12.2 | 13.0 |

[a] Moles amine/mer polyacrylamide.
[b] Control.

TABLE 2.—FLOCCULANT ACTIVITY OF MODIFIED CATIONIC POLYACRYLAMIDE

| Run | Amine | Transamidation Conditions | | Starch Flocculation, in./min. | |
|---|---|---|---|---|---|
| | | Ratio a | T., °C./Time | 5.0 p.p.m. | 10.0 p.p.m. |
| 3B-1 | None | | | 0 | 0 |
| 3B-2 | $(CH_3)_2NC_3H_6NH_2$ | 2.5 | 130°/2 hrs | 13.7 | 13.2 |
| 3B-3 | $(CH_3)_3\overset{+}{N}CH_2CHOHCH_2NH_2Cl-$ | 1.0 | 130°/5 hrs | | 6.7 |
| 3B-4 | $(HOC_2H_4)_2NC_2H_4NH_2$ | 1.1 | 145°/0.5 hr | 6.5 | 11.7 |
| 3B-5 | $(C_2H_5)_2NC_2H_4NH_2$ | 0.9 | 145°/1 hr | 12.5 | 13.2 | a Moles amine/mer polyacrylamide.

I claim:
1. A process for preparing a water-soluble cationic polyacrylamide which comprises transamidation of a water-soluble polyacrylamide having the formula:

$$H-\left(\begin{array}{c}CR-CH_2\\|\\CO-NH_2\end{array}\right)_n-H$$

where R is H or $C_1$–$C_4$ alkyl, and $n$ is a number such that the polyacrylamide has an average molecular weight of at least $0.1 \times 10^6$,
by heating at about 80–150° C. with about 0.5–3.0 moles per mer of an alkylenediamine having the formula:

$$NH_2-C_aH_{2a}-NR_1R_2 \text{ or } NH_2-C_aH_{2a}-\overset{+}{N}R_1R_2R_3X-$$

where $R_1$, $R_2$ and $R_3$ individually are $C_1$–$C_4$ alkyl or $C_2$–$C_4$ hydroxyalkyl groups, $a$ is 2–5, and X is a counteranion,
in the presence of an alkylene glycol or glycol ether having the formula:

$$HO-C_bH_{2b}-OR'$$

where R' is H or $C_1$–$C_4$ alkyl, and $b$ is 2–5.
2. The process of claim 1 where the polyacrylamide has an average molecular weight of about $1-10 \times 10^6$.
3. A water-soluble cationic polyacrylamide consisting essentially of a terpolymer of:
(A) about 20–70 weight percent of an acrylamide having the formula:

$$\overset{O}{\underset{\|}{CH_2=CRCNH_2}}$$

where R is H or $C_1$–$C_4$ alkyl;
(B) about 20–75 weight percent of an N-aminoalkyl-acrylamide having the formula:

$$\overset{O}{\underset{\|}{CH_2=CRCNHC_aH_{2a}Z}}$$

where R is H or $C_1$–$C_4$ alkyl, $a$ is 2–5 and Z is a tertiary or quaternary nitrogen having the formula:

$$-NR_1R_2 \text{ or } -\overset{+}{N}R_1R_2R_3X-$$

where $R_1$, $R_2$, and $R_3$ individually are $C_1$–$C_4$ alkyl or $C_2$–$C_4$ hydroxyalkyl, and X is a counteranion; and
(C) about 5–20 weight percent of an oxyalkyl acrylate having the formula:

$$\overset{O}{\underset{\|}{CH_2=CRCOC_bH_{2b}OR'}}$$

where R and R' individually are H or $C_1$–$C_4$ alkyl, and $b$ is 2–5.
4. The cationic polyacrylamide of claim 3 where (A) is acrylamide.
5. The cationic polyacrylamide of claim 3 where (B) is dimethylaminoethylacrylamide.
6. The cationic polyacrylamide of claim 3 where (B) is diethylaminoethylacrylamide.
7. The cationic polyacrylamide of claim 3 where (C) is β-hydroxyethyl acrylate.
8. The cationic polyacrylamide of claim 3 where Z is a tertiary amino group.
9. The cationic polyacrylamide of claim 8 in solid hydrochloride salt form.

References Cited

UNITED STATES PATENTS

| 2,729,560 | 1/1956 | House et al. |
| 2,845,408 | 7/1958 | Melamed. |
| 2,884,057 | 4/1959 | Wilson et al. |
| 2,892,822 | 6/1959 | Gray et al. |

JOSEPH L. SCHOFER, Primary Examiner

S. M. LEVIN, Assistant Examiner

U.S. Cl. X.R.

260—89.7